US008808659B2

(12) United States Patent
Shiflett et al.

(10) Patent No.: US 8,808,659 B2
(45) Date of Patent: Aug. 19, 2014

(54) PROCESS AND REACTOR SYSTEM FOR PRODUCING AMMONIA USING IONIC LIQUIDS

(75) Inventors: Mark Brandon Shiflett, Wilmington, DE (US); Akimichi Yokozeki, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 293 days.

(21) Appl. No.: 13/014,761

(22) Filed: Jan. 27, 2011

(65) Prior Publication Data
US 2012/0027661 A1    Feb. 2, 2012

Related U.S. Application Data

(60) Provisional application No. 61/286,610, filed on Jan. 28, 2010.

(51) Int. Cl.
*C01C 1/04*    (2006.01)

(52) U.S. Cl.
USPC .......................................................... 423/359

(58) Field of Classification Search
USPC .................................................. 423/359–363
See application file for complete search history.

(56) References Cited

U.S. PATENT DOCUMENTS

| | | | | | |
|---|---|---|---|---|---|
| 1,319,663 | A | * | 10/1919 | Davis et al. ................... | 423/359 |
| 1,727,174 | A | * | 9/1929 | Muller et al. .................. | 252/377 |
| 4,376,758 | A | * | 3/1983 | Pagani et al. ................. | 423/359 |
| 4,537,760 | A | * | 8/1985 | Lavie ............................. | 423/359 |
| 4,816,121 | A | * | 3/1989 | Keefer .......................... | 204/156 |
| 5,114,694 | A | * | 5/1992 | Grotz, Jr. ..................... | 423/352 |
| 5,230,877 | A | * | 7/1993 | Eimer et al. .................. | 423/359 |
| 6,955,797 | B1 | * | 10/2005 | Speth ............................ | 423/360 |
| 2001/0002245 | A1 | * | 5/2001 | Pagani et al. ................. | 423/359 |
| 2006/0039847 | A1 | * | 2/2006 | Kaboord et al. .............. | 423/359 |
| 2006/0197053 | A1 | * | 9/2006 | Shiflett et al. ................... | 252/67 |
| 2008/0153697 | A1 | | 6/2008 | Shiflett et al. | |
| 2010/0260655 | A1 | * | 10/2010 | Nakanishi et al. ............ | 423/359 |
| 2011/0286907 | A1 | * | 11/2011 | Nakamura et al. ............ | 423/359 |

FOREIGN PATENT DOCUMENTS

| | | | |
|---|---|---|---|
| GB | 2033882 | * | 5/1980 |
| WO | 2005/113702 A1 | | 12/2005 |

OTHER PUBLICATIONS

Yokozeki et al, "Ammonia Solubilities in Room-Temperature Ionic Liquids" Ind. Eng. Chem. Res. 2007, 46, 1605-1610.
Yokozeki et al, "Vapor-liquid Equilibria of Ammonia + Ionic Liquid Mixtures", 84 (2007) 1258-1273.
Michael Freemantle, "Ionic liquids may boost clean technology development" Mar. 30, 1998, pp. 32-37.
Kenneth R. Seddon, "Ionic Liquids for Clean Technology", 1997, 68, pp. 351-356.
Thomas Welton, "Room Temperature Ionic Liquids, Solvents for Synthesis and Catalysis", 1999, 99, pp. 2071-2083.
John E. Enderby, "Ionic Liqids: Recent Progress and Remaining Problems", 5 (1993) B99-B106.
J. Mater. Chem. 8:2627-2636 (1998).

* cited by examiner

*Primary Examiner* — Wayne Langel

(57) ABSTRACT

A process and a reactor system for producing ammonia is described. The ammonia produced, such as by the Haber process, is absorbed into an ionic liquid. The removal of ammonia shifts the reaction equilibrium toward the production of ammonia, resulting in higher yields of ammonia.

12 Claims, 3 Drawing Sheets

PROCESS AND REACTOR SYSTEM FOR PRODUCING AMMONIA USING IONIC LIQUIDS

This application claims priority under 35 U.S.C. §119(e) from, and claims the benefit of, U.S. Provisional Application No. 61/286,610, filed Jan. 28, 2010, which is by this reference incorporated in its entirety as a part hereof for all purposes.

TECHNICAL FIELD

The invention relates to the field of ammonia synthesis, and more particularly to a process and reactor system for producing ammonia by the reaction of nitrogen and hydrogen.

BACKGROUND

Ammonia synthesis is one of the largest industrially-practiced chemical reactions due to the widespread use of ammonia. For example, ammonia is used in the production of fertilizers, explosives, fibers, plastics and pharmaceuticals, and as a refrigerant in large scale refrigeration plants and in air conditioning systems for buildings of all kinds. Ammonia is also used in the pulp and paper industry, in mining and metallurgy, and as a cleaning agent.

Industrially, ammonia is produced by the Haber process, which was developed at the beginning of the twentieth century. The Haber process involves reacting gaseous nitrogen and gaseous hydrogen over an iron-based catalyst at high temperature and pressure. However, the yield of ammonia by the Haber process is limited by the effect of temperature on the reaction equilibrium. Specifically, decreasing the temperature of the reaction causes the equilibrium position to shift toward the formation of ammonia, resulting in a higher yield of ammonia. However, as the rate of reaction at lower temperatures is extremely slow, a higher temperature is used to obtain practical reaction rates, which reduces the amount of the yield of ammonia, i.e. typically to a level of about 10-20%. In the industrial production of ammonia, the gas mixture from the reactor is cooled to liquefy the ammonia and the remaining mixture of reactant gases is recycled back to the reactor to obtain higher overall yields.

Ionic liquids have been shown to absorb large amounts of ammonia (Yokozeki et al, *Ind. Eng. Chem. Res.*, 46:1605-1610, 2007; and Yokozeki et al, *Appl. Energy*, 84:1258-1273, 2007); and the use of ionic liquids as a working fluid with various refrigerants, including ammonia, in absorption refrigeration cycles is described by Shiflett et al (U.S. Patent Application Publication No. 2006/0197053). A need nevertheless remains for an improved process to produce ammonia in higher yields.

SUMMARY

The present invention addresses the stated problem by providing a process and reactor system for the production of ammonia from the reaction of hydrogen and nitrogen, wherein an ionic liquid is used to absorb the ammonia produced by the reaction. The removal of ammonia shifts the reaction equilibrium toward the production of ammonia, resulting in higher yields of ammonia.

Accordingly, in one embodiment of the inventions hereof there is provided a process for producing ammonia by the steps of (a) combining and contacting nitrogen and hydrogen in the presence of a catalyst under conditions of temperature and pressure whereby ammonia is produced; and (b) contacting the ammonia produced with at least one ionic liquid whereby at least a portion of the ammonia is absorbed by an ionic liquid.

In another embodiment of the inventions hereof, there is provided a reactor system that includes (a) a first stage wherein nitrogen and hydrogen are combined in the presence of a catalyst under conditions of temperature and pressure whereby ammonia is produced; and (b) a second stage wherein the ammonia produced is contacted with at least one ionic liquid whereby at least a portion of the ammonia is absorbed by an ionic liquid.

More specifically, the inventions hereof relate to a process and a reactor system for producing ammonia wherein an ionic liquid is used to absorb the ammonia produced by the reaction of nitrogen and hydrogen, with the consequence that the reaction equilibrium is shifted forward to increase the rate of production of ammonia.

BRIEF DESCRIPTION OF THE DRAWINGS

Various features and/or embodiments of this invention are illustrated in drawings as described below. These features and/or embodiments are representative only, and the selection of these features and/or embodiments for inclusion in the drawings should not be interpreted as an indication that subject matter not included in the drawings is not suitable for practicing the invention, or that subject matter not included in the drawings is excluded from the scope of the appended claims and equivalents thereof.

DETAILED DESCRIPTION

Figure 1:
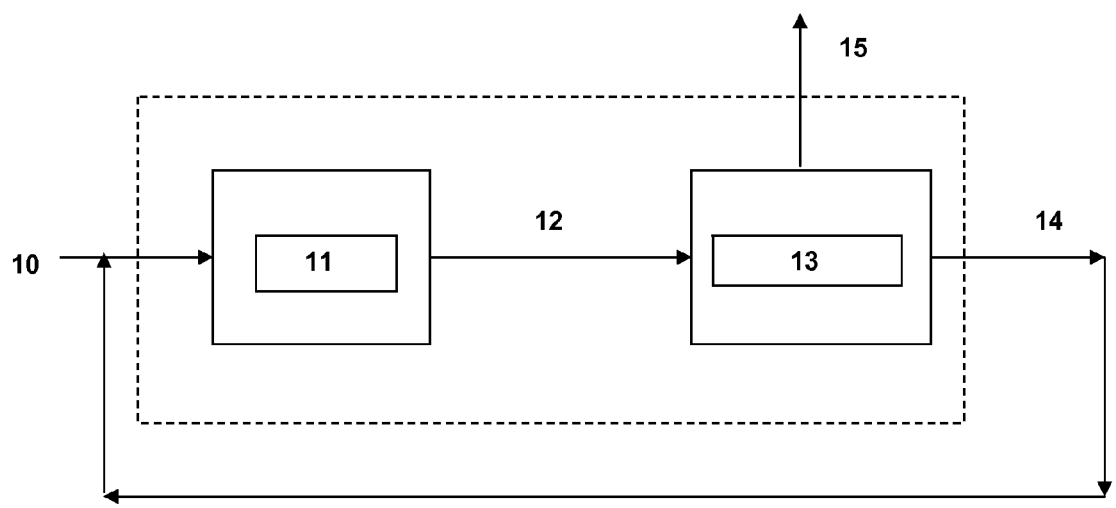
FIG. 1 is a block diagram of an exemplary reactor system for use in the production of ammonia using the processes described herein.

Disclosed herein are a process and a reactor system for producing ammonia using ionic liquids. In one embodiment of a process hereof, ammonia is produced by the well-known Haber process, but ammonia for use in a process hereof can be produced by methods other than the Haber process. In a process hereof, the ammonia, once produced by whatever method, is absorbed into an ionic liquid. The absorption of the ammonia into an ionic liquid, and consequent removal of it from the reaction mixture, shifts the reaction equilibrium toward the production of ammonia, resulting in higher yields of ammonia.

The ammonia produced may be used in the production of fertilizers, explosives, fibers, plastics and pharmaceuticals, and as a refrigerant in large scale refrigeration plants and in air conditioning systems for buildings of all kinds. The ammonia may also be used in the pulp and paper industry, in mining and metallurgy, and as a cleaning agent.

In one embodiment of the inventions hereof, there is provided a process for producing ammonia by the steps of (a) combining and contacting nitrogen and hydrogen in the presence of a catalyst under conditions of temperature and pressure whereby ammonia is produced; and (b) contacting the ammonia produced with at least one ionic liquid whereby at least a portion of the ammonia is absorbed into an ionic liquid. In an example of one embodiment of a process hereof, ammonia can be produced by the well-known Haber process, and the operation of that process can thus constitute the step (a) of a process hereof. Briefly, in the Haber process, hydrogen gas and nitrogen gas are combined at a temperature of about 300° C. to about 550° C. and at a pressure of about 8 MPa to about 40 MPa in the presence of a catalyst to produce ammonia. Typically, the hydrogen gas and the nitrogen gas are combined in a mole ratio of about 3:1 (i.e. 3 moles of hydrogen for every mole of nitrogen). Catalysts suitable for use in running the Haber process include a porous iron catalyst, which may be prepared by reducing magnetite ($Fe_3O_4$). Alternatively, osmium and uranium may be used as catalysts.

In the second step of a process hereof, the ammonia produced is contacted with an ionic liquid to absorb at least a portion of the ammonia. The portion of ammonia absorbed, and thereby removed from the reaction, is sufficient to shift the reaction equilibrium toward the production of ammonia, resulting in higher yield. The production ammonia and an ionic liquid can be contacted at a temperature in the range of about 20° C. to about 200° C., and a pressure of about 100 kPA to about 40 MPa. The amount of ionic liquid to be used can be adjusted in respect of the amount of ammonia produced in the reaction, and the affinity of a specific ionic liquid for ammonia. The ammonia absorbed by an ionic liquid may be recovered from the mixture resulting therefrom by heating the ionic liquid that contains the absorbed ammonia. As hydrogen and nitrogen are essentially insoluble in ionic liquids, nitrogen and hydrogen gases that are not reacted to form ammonia will pass through the step in which ammonia is absorbed by an ionic liquid, and are available to be recycled back into the reaction to produce more ammonia.

An ionic liquid suitable for use in a process hereof to absorb ammonia includes any ionic liquid that does absorb ammonia, but an ionic liquid that absorbs ammonia to a lesser extent, although still useful, will be less effective. Mixtures of two or more ionic liquids may be used for the purpose of absorbing the production ammonia.

An ionic liquid as used herein is, in general, an organic salt that is fluid at or below a temperature of about 100° C., and, in certain embodiments, can be a solid at a temperature above about 20° C. Representative examples of ionic liquids suitable for use herein are included among those that are described in sources such as *J. Chem. Tech. Biotechnol.*, 68:351-356 (1997); *Chem. Ind.*, 68:249-263 (1996); *J. Phys. Condensed Matter*, 5: (supp 34B):899-8106 (1993); *Chemical and Engineering News*, Mar. 30, 1998, 32-37; *J. Mater. Chem.*, 8:2627-2636 (1998); *Chem. Rev.*, 99:2071-2084 (1999); and WO 05/113,702 (and references cited therein). In one embodiment, a library, i.e. a combinatorial library, of ionic liquids may be prepared by preparing, for example, various alkyl derivatives of a quaternary ammonium cation and varying the associated anions. The acidity of the ionic liquids can be adjusted by varying the molar equivalents and type and combinations of Lewis acids.

Many ionic liquids are formed by reacting a nitrogen-containing heterocyclic ring, preferably a heteroaromatic ring, with an alkylating agent (for example, an alkyl halide) to form a quaternary ammonium salt, and performing ion exchange or other suitable reactions with various Lewis acids or their conjugate bases to form the ionic liquid. Examples of suitable heteroaromatic rings include substituted pyridines, imidazole, substituted imidazole, pyrrole and substituted pyrroles. These rings can be alkylated with virtually any straight, branched or cyclic $C_{1-20}$ alkyl group, but the alkyl groups are preferably $C_{1-16}$ groups. Various triarylphosphines, thioethers and cyclic and non-cyclic quaternary ammonium salts may also be used for this purpose. Ionic liquids suitable for use herein may also be synthesized by salt metathesis, by an acid-base neutralization reaction or by quaternizing a selected nitrogen-containing compound. The synthesis of other ionic liquids suitable for use herein is described in Shiflett, U.S. Patent Application Publication No. 2006/0197053, which is by this reference incorporated in its entirety as a part hereof for all purposes. Ionic liquids may also be obtained commercially from several companies such as Merck (Darmstadt, Germany), BASF (Mount Olive N.J.), Fluka Chemical Corp. (Milwaukee Wis.), and Sigma-Aldrich (St. Louis Mo.).

Ionic liquids suitable for use herein comprise an anion and a cation, and in various embodiments the cation can be selected from the group consisting of cations represented by the structures of the following formulae:

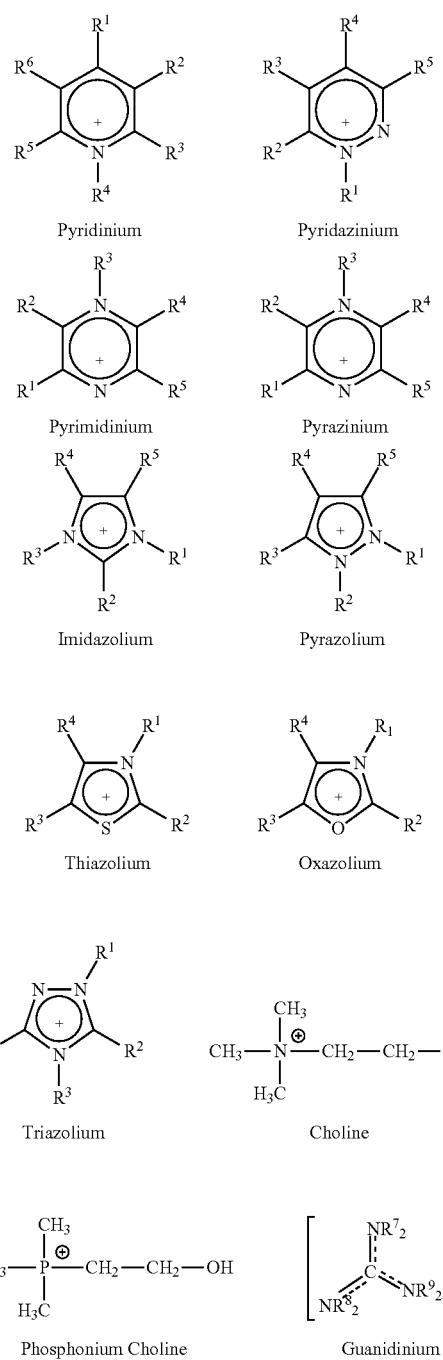

-continued

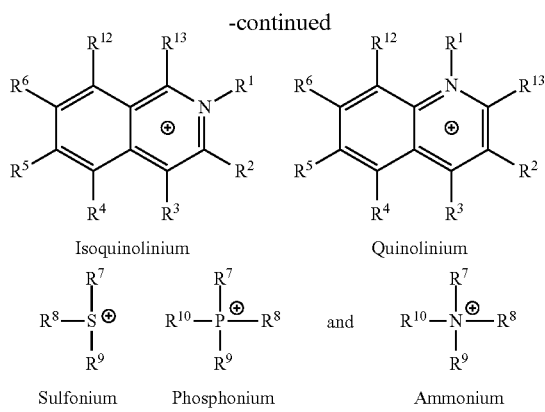

Isoquinolinium　　Quinolinium

Sulfonium　　Phosphonium　　and　　Ammonium wherein:
(a) $R^1$, $R^2$, $R^3$, $R^4$, $R^5$, $R^6$, $R^{12}$ and $R^{13}$ are independently selected from the group consisting of:
  (i) H;
  (ii) halogen such as F;
  (iii) —$CH_3$, —$C_2H_5$, or $C_3$ to $C_{25}$ straight-chain, branched or cyclic alkane or alkene groups, optionally substituted with at least one member selected from the group consisting of Cl, Br, F, I, OH, $NH_2$ and SH;
  (iv) —$CH_3$, —$C_2H_5$, or $C_3$ to $C_{25}$ straight-chain, branched or cyclic alkane or alkene groups comprising one to three heteroatoms selected from the group consisting of O, N, Si and S, and optionally substituted with at least one member selected from the group consisting of Cl, Br, F, I, OH, $NH_2$ and SH;
  (v) $C_6$ to $C_{20}$ unsubstituted aryl, or $C_6$ to $C_{25}$ unsubstituted heteroaryl, groups having one to three heteroatoms independently selected from the group consisting of O, N, Si and S;
  (vi) $C_6$ to $C_{25}$ substituted aryl, or $C_6$ to $C_{25}$ substituted heteroaryl, groups having one to three heteroatoms independently selected from the group consisting of O, N, Si and S; and wherein said substituted aryl or substituted heteroaryl has one to three substituents independently selected from the group consisting of:
    (A) —$CH_3$, —$C_2H_5$, or $C_3$ to $C_{25}$ straight-chain, branched or cyclic alkane or alkene groups, optionally substituted with at least one member selected from the group consisting of Cl, Br, F, I, OH, $NH_2$ and SH,
    (B) OH,
    (C) $NH_2$, and
    (D) SH; and
  (vii) —$(CH_2)_nSi(CH_2)_mCH_3$, —$(CH_2)_nSi(CH_3)_3$, —$(CH_2)_nOSi(CH_3)_m$, where n is independently 1-4 and m is independently 0-4;
(b) $R^7$, $R^8$, $R^9$, and $R^{10}$ are independently selected from the group consisting of:
  (i) —$CH_3$, —$C_2H_5$, or $C_3$ to $C_{25}$ straight-chain, branched or cyclic alkane or alkene groups, optionally substituted with at least one member selected from the group consisting of Cl, Br, F, I, OH, $NH_2$ and SH;
  (ii) —$CH_3$, —$C_2H_5$, or $C_3$ to $C_{25}$ straight-chain, branched or cyclic alkane or alkene groups comprising one to three heteroatoms selected from the group consisting of O, N, Si and S, and optionally substituted with at least one member selected from the group consisting of Cl, Br, F, I, OH, $NH_2$ and SH;
  (iii) $C_6$ to $C_{25}$ unsubstituted aryl, or $C_6$ to $C_{25}$ unsubstituted heteroaryl, groups having one to three heteroatoms independently selected from the group consisting of O, N, Si and S; and
  (iv) $C_6$ to $C_{25}$ substituted aryl, or $C_6$ to $C_{25}$ substituted heteroaryl, groups having one to three heteroatoms independently selected from the group consisting of O, N, Si and S, and wherein the substituted aryl or substituted heteroaryl group has one to three substituents independently selected from the group consisting of:
    (A) —$CH_3$, —$C_2H_5$, or $C_3$ to $C_{25}$ straight-chain, branched or cyclic alkane or alkene groups, optionally substituted with at least one member selected from the group consisting of Cl, Br, F, I, OH, $NH_2$ and SH,
    (B) OH,
    (C) $NH_2$, and
    (D) SH; and
  (v) —$(CH_2)_nSi(CH_2)_mCH_3$, —$(CH_2)_nSi(CH_3)_3$, —$(CH_2)_nOSi(CH_3)_m$, where n is independently 1-4 and m is independently 0-4; and
(c) optionally, at least two of $R^1$, $R^2$, $R^3$, $R^4$, $R^5$, $R^6$, $R^7$, $R^8$, $R^9$, and $R^{10}$ can together form a cyclic or bicyclic alkanyl or alkenyl group.

In one embodiment, an ionic liquid can contain an anion selected from one or more members of the group consisting of: $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_3]^{3-}$, $[HPO_3]^{2-}$, $[H_2PO_3]^{1-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$, carborates optionally substituted with alkyl or substituted alkyl; carboranes optionally substituted with alkylamine, substituted alkylamine, alkyl or substituted alkyl; and a fluorinated anion.

In a further embodiment, an ionic liquid can contain a cation selected from one or more members of the group consisting of pyridinium, pyridazinium, pyrimidinium, pyrazinium, imidazolium, pyrazolium, thiazolium, oxazolium, triazolium, phosphonium, ammonium, benzyltrimethylammonium, choline, dimethylimidazolium, guanidinium, phosphonium choline, tetramethylammonium, and tetramethylphosphonium.

In yet another embodiment, an ionic liquid can contain an anion selected from one or more members of the group consisting of aminoacetate, ascorbate, benzoate, catecholate, citrate, dimethylphosphate, formate, fumarate, gallate, glycolate, glyoxylate, iminodiacetate, isobutyrate, kojate, lactate, levulinate, oxalate, pivalate, propionate, pyruvate, salicylate, succinamate, succinate, tiglate, tetrafluoroborate, tetrafluoroethanesulfonate, tropolonate, $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_3]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$, $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]$, $[CF_3CF_2OCF_2CF_2SO_3]^-$, $[(CF_2HCF_2SO_2)_2N]_-$, $[(CF_3CFHCF_2SO_2)_2N]^-$, $F^-$, and anions represented by the structure of the following formula:

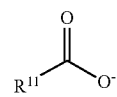

wherein $R^{11}$ is selected from the group consisting of:
  (i) —$CH_3$, —$C_2H_5$, or $C_3$ to $C_{10}$ straight-chain, branched or cyclic alkane or alkene groups, optionally substituted with at least one member selected from the group consisting of Cl, Br, F, I, OH, $NH_2$ and SH;

(ii) —CH$_3$, —C$_2$H$_5$, or C$_3$ to C$_{10}$ straight-chain, branched or cyclic alkane or alkene groups that contain one to three heteroatoms selected from the group consisting of O, N, Si and S, and are optionally substituted with at least one member selected from the group consisting of Cl, Br, F, I, OH, NH$_2$ and SH;

(iii) C$_6$ to C$_{10}$ unsubstituted aryl, or C$_6$ to C$_{10}$ unsubstituted heteroaryl, groups having one to three heteroatoms independently selected from the group consisting of O, N, Si and S; and (iv) C$_6$ to C$_{10}$ substituted aryl, or C$_6$ to C$_{10}$ substituted heteroaryl, groups having one to three heteroatoms independently selected from the group consisting of O, N, Si and S; and wherein the substituted aryl or substituted heteroaryl group has one to three substituents independently selected from the group consisting of:

(A) —CH$_3$, —C$_2$H$_5$, or C$_3$ to C$_{10}$ straight-chain, branched or cyclic alkane or alkene groups, optionally substituted with at least one member selected from the group consisting of Cl, Br, F, I, OH, NH$_2$ and SH;

(B) OH, (C) NH$_2$, and (D) SH.

In yet another embodiment, an ionic liquid as used herein is selected from the group consisting of 1-butyl-3-methylimidazolium hexafluorophosphate ([bmim][PF$_6$]), 1-butyl-3-methylimidazolium tetrafluoroborate ([bmim][BF$_4$]), 1-ethyl-3-methylimidazolium bis(trifluoromethylsulfonyl)imide ([emim][Tf$_2$N]), 1-hexyl-3-methylimidazolium chloride ([hmim][Cl]), 1-ethyl-3-methylimidazolium acetate ([emim][CH$_3$COO]), 1-ethyl-3-methylimidazolium ethylsulfate ([emim][EtOSO$_3$]), 1-ethyl-3-methylimidazolium thiocyanate ([emim][SCN]), and N,N-dimethylethanolammonium ethanoate.

In yet another embodiment, an ionic liquid as used herein can have a fluorinated cation and/or a fluorinated anion.

In yet another embodiment of the inventions hereof, there is provided a reactor system for the production of ammonia. The reactor system can be a two-stage system that contains (a) a first stage wherein nitrogen and hydrogen are combined in the presence of a catalyst under conditions of temperature and pressure whereby ammonia is produced (as described above); and (b) a second stage wherein the ammonia produced is contacted with at least one ionic liquid, whereby at least a portion of the ammonia is absorbed by an ionic liquid. A block diagram of an exemplary reactor system for use in the production of ammonia using the process disclosed herein is shown in FIG. 1.

Referring to FIG. 1, in the first stage a feed stream 10 containing a mixture of nitrogen and hydrogen gases is fed into a reactor 11 containing a suitable catalyst, as described above. Typically, the feed stream contains the hydrogen gas and nitrogen gas in a mole ratio of about 3:1. The reactor is operated at a temperature and pressure whereby ammonia is produced, for example a temperature of about 300° C. to about 550° C., and at a pressure of about 8 MPa to about 40 MPa. The reactor may be any suitable gas reactor known in the art that is able to withstand the temperature and pressure ranges used in the reaction. The equilibrium conversion to ammonia in the reactor can be in the range of about 10-20%, and in such cases large amounts of unreacted hydrogen and nitrogen exit the reactor along with the ammonia in the product stream 12.

In the second stage, the product stream is fed into an ionic liquid absorber 13 that contains an ionic liquid, and wherein the product stream contacts an ionic liquid and at least a portion of the ammonia is absorbed. The ionic liquid absorber may be operated at a temperature in the range of about 20° C. to about 200° C. and at a pressure in the range of about 100 kPa to about 40 MPa. Unreacted nitrogen and hydrogen are not absorbed to any appreciable extent by an ionic liquid and exit the absorber in stream 14, which is fed back into the reactor and combined with fresh nitrogen and hydrogen to provide the proper feed composition. The ammonia product, as absorbed by an ionic liquid, can be recovered by heating the mixture (formed from an ionic liquid and absorbed ammonia) in the absorber, and exits the absorber in stream 15.

Figure 2:
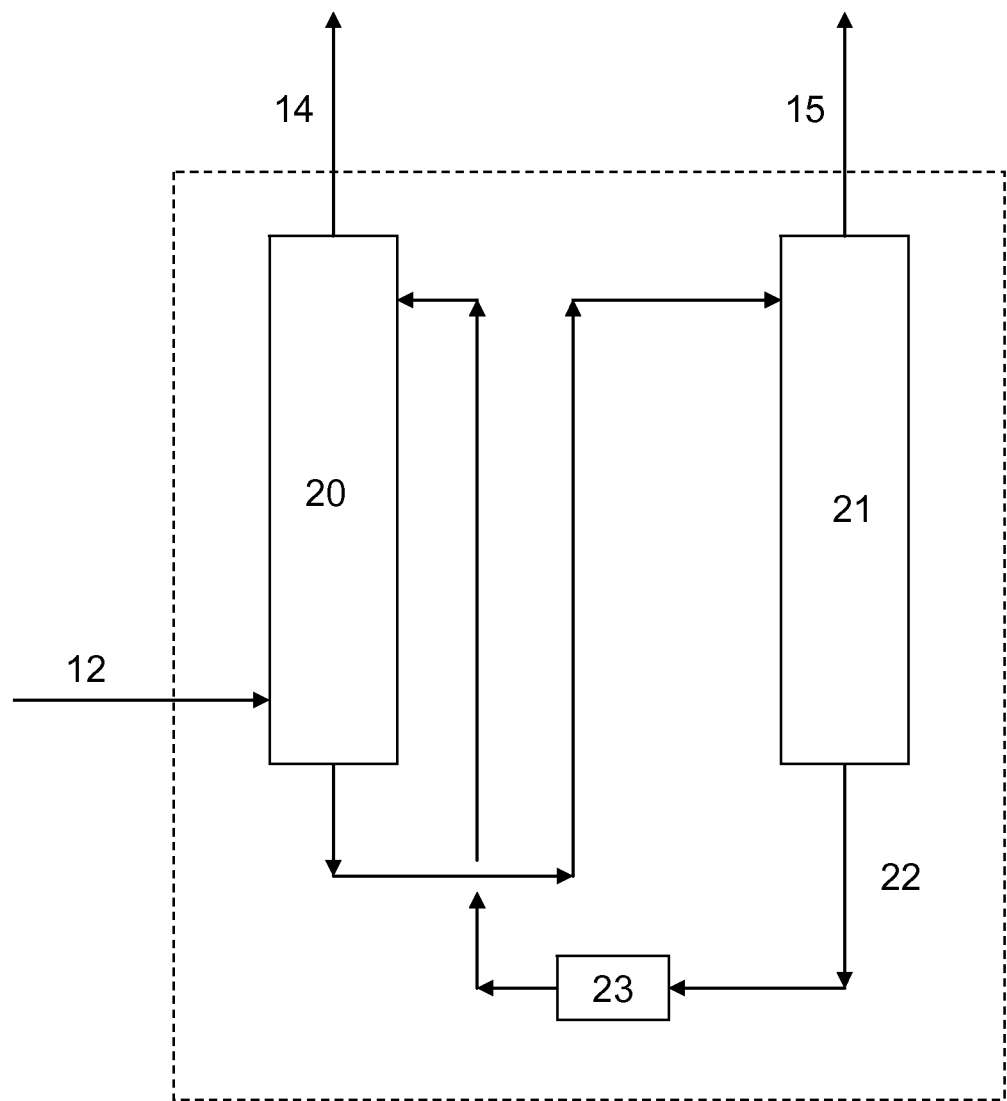
FIG. 2 is a schematic drawing of an exemplary ionic liquid absorber for use in the reactor systems described herein.

One example of an ionic liquid absorber 13 suitable for use herein is illustrated in the schematic drawing shown in FIG. 2. Referring to FIG. 2, the ionic liquid absorber comprises an absorption column 20 containing an ionic liquid. The product stream 12 from the reactor, which typically contains production ammonia and unreacted nitrogen and hydrogen, is fed into the absorption column 20, and at least a portion of the ammonia is absorbed by an ionic liquid. Essentially all of the nitrogen and hydrogen gas passes through the absorption column in stream 14 and is returned to the reactor. An ionic liquid containing the absorbed ammonia then passes to a stripping column 21 where the ionic liquid is heated to release the ammonia in stream 15, and the ionic liquid in stream 22 is then recycled back through a pump 23 to the absorption column 20.

EXAMPLES

This invention is further defined in the following examples. It should be understood that these examples, while indicating preferred embodiments of the invention, are given by way of illustration only, and the selection of those embodiments to illustrate the invention does not indicate that materials, components, reactants, designs, conditions and techniques not described in the examples are not suitable for use herein, or that subject matter not described in the examples is excluded from the scope of the appended claims and equivalents thereof. From the above discussion and these examples, one skilled in the art can ascertain the essential characteristics of this invention, and without departing from the spirit and scope thereof, can make various changes and modifications of the invention to adapt it to various uses and conditions.

The meaning of abbreviations used is as follows: "min" means minute(s), "h" means hour(s), "mL" means milliliter(s), "4" means microliter(s), "g" means gram(s), "mg" means milligram(s), "µg" means microgram(s) "mol %" means mole percent relative to the total number of moles in the system. "Pa" means pascal(s). "kPa" means kilopascal(s). "MPa" means megapascal(s).

Materials

High purity, anhydrous ammonia (purity≥99.999%, semi-conductor grade, CAS no. 2664-41-7) was obtained from MG Industries (Philadelphia, Pa.). The following ionic liquids were used in the examples:

1-butyl-3-methylimidazolium hexafluorophosphate ([bmim][PF$_6$]; assay≥96%, CAS no. 174501-64-5), 1-hexyl-3-methylimidazolium chloride ([hmim][Cl]; assay≥97%, CAS no. 171058-17-6), 1-ethyl-3-methylimidazolium bis(trifluoromethylsulfonyl)imide ([emim][Tf$_2$N]; assay≥97%, CAS no. 174899-82-2), 1-butyl-3-methylimidazolium tetrafluoroborate ([bmim][BF$_4$]; assay≥97%, CAS no. 174501-65-6), 1-ethyl-3-methylimidazolium acetate ([emim][CH$_3$COO]; assay≥90%, CAS no. 143314-17-4), 1-ethyl-3-methylimidazolium ethylsulfate ([emim][EtOSO$_3$]; assay≥95%, CAS no. 343573-75-5), and 1-ethyl-3-methylimidazolium thiocyanate ([emim][SCN]; assay≥95%, CAS no. 331717-63-6).

These ionic liquids were obtained from Fluka (Buchs, Switzerland), and are also distributed by Sigma-Aldrich (St. Louis, Mo.) in the United States. N,N-dimethylethanolammonium ethanoate (also called acetate, assay≥99%) was obtained from Bioniqs (York, England).

All of the ionic liquid samples were dried and degassed, with the exception of N,N-dimethylethanolammonium ethanoate, by placing the samples in borosilicate glass tubes and applying a course vacuum with a diaphragm pump (Pfeiffer Vaccum Inc., Nashua, N.H.; model MVP055-3) for about 3 h. The samples were then dried at a pressure of about $4 \times 10^{-7}$ kPa while simultaneously heating and stirring the ionic liquids at a temperature of about 348° K for 48 h.

General Method

Figure 3:
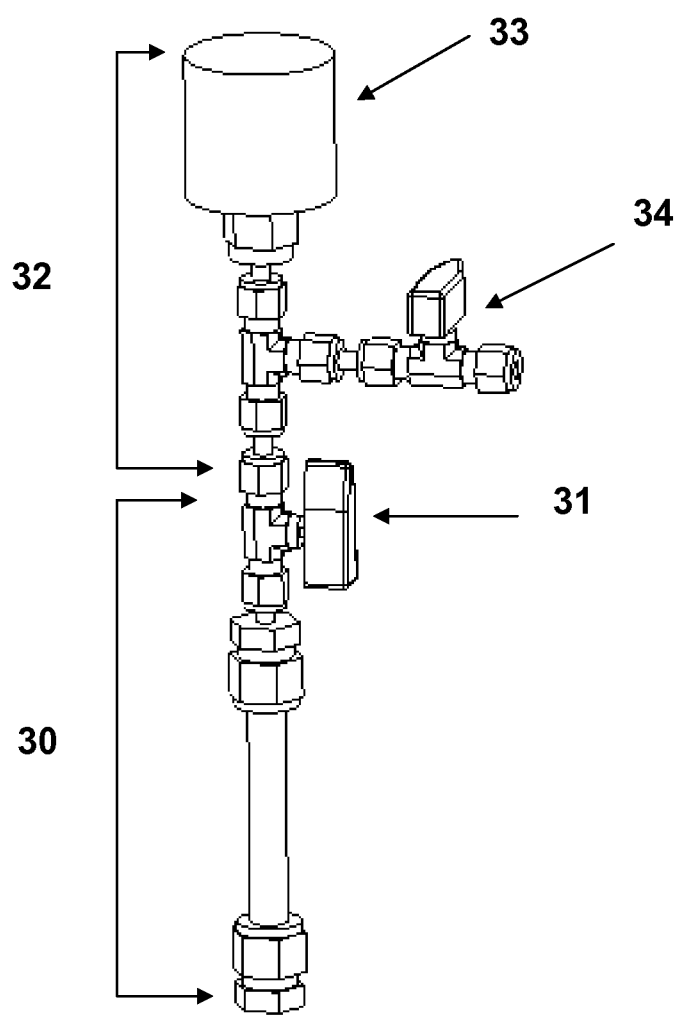
FIG. 3 is a schematic drawing of the static phase equilibrium cell used in the examples described herein.

The following experimental method was employed to demonstrate the solubility of ammonia in the ionic liquids. Six static phase equilibrium cells were constructed as shown in FIG. 3. Each cell was made using SWAGELOK fittings, two SWAGELOK ball valves (SS-426S4), stainless steel tubing, and a pressure transducer (Dwyer Instruments, Michigan City, Ind.; model 682-5). The internal volume of each cell was calculated by measuring the mass of methanol required to completely fill the cell. Knowing the density of methanol at the fill temperature, the volume was calculated. The internal volume of each cell ($V_T$) was in the range of about 13.4 to 15.3±0.1 cm$^3$. Referring to FIG. 3, the lower half of the cell 30 was used to prepare the NH$_3$/ionic liquid mixtures. Ionic liquid was loaded by mass (0.5 to 2 g) and weighed on an analytical balance, with a resolution of 0.1 mg, inside a nitrogen-purged dry box. A syringe fitted with a stainless steel needle (Popper & Son, Inc., Lincoln, R.I.; model 7937, 18×152.4 mm pipetting needle) which fit through the open sample valve 31 was used to fill the cell with ionic liquid. The ball valve was closed and the cell was removed from the dry box. The cell was connected to a diaphragm pump to remove residual nitrogen and weighed again to obtain the initial ionic liquid mass.

The NH$_3$ gas was loaded by mass (0.02 to 0.8 g) from a high pressure gas cylinder. The NH$_3$ gas pressure was regulated to about 500 kPa with a two-stage gas regulator (Matheson Gas Products, Montgomeryville, Pa.). The sample tubing between the gas regulator and cell was evacuated prior to filling with NH$_3$ gas. The cell was placed on an analytical balance and gas was slowly added until the desired mass of NH$_3$ was obtained. For samples that required more than 0.1 g of NH$_3$, the cell was cooled in dry ice to condense NH$_3$ gas inside the cell. To obtain the final mass of NH$_3$ added to the cell, the sample valve 31 was closed and the cell was disconnected from the gas cylinder, and weighed on the analytical balance. The upper half of the cell 32 which included the pressure transducer 33 was connected with a Swagelok fitting to the lower half 30. The interior volume of the upper half of the cell 32 was evacuated through a second valve 34 using the diaphragm pump. Valve 34 was closed and capped and sample valve 31 was opened.

The six sample cells were placed inside a tank and the temperature was controlled with an external temperature bath, either a water bath (VWR International, West Chester pA; Model 1160S), or an oil bath (Tamson Instruments, Bleiswijk, The Netherlands; TV4000LT hot oil bath), circulating through a copper coil submerged in the tank. The temperature was initially set at about 283° K. The temperature was measured using a Fluke thermometer (Hart Scientific, American Fork, Utah). The sample cells were vigorously shaken to assist with mixing prior to being immersed in the tank. The water or oil level in the tank was adjusted such that the entire cell was under fluid including the bottom 2 cm of the pressure transducer. The cells were rocked back and forth in the tank to enhance mixing. The pressure was recorded every hour until no change in pressure was measured. To ensure the samples were at equilibrium and properly mixed, the cells were momentarily removed from the tank and again vigorously shaken. The cells were placed back in the tank and the process was repeated until no change in pressure was measured. In all cases, the cells reached equilibrium in 4 to 8 hours. The process was repeated at higher temperatures of about 298° K, 323° K and 348° K. Additional measurements at 355° K were made for [bmim][PF$_6$] and [bmim][BF$_4$], and 373° K measurements were made for ([emim][EtOSO$_3$], [emim][SCN], and N,N-dimethylethanolammonium ethanoate.

The Dwyer pressure transducers were calibrated against a Paroscientific Model 760-6K pressure transducer (Paroscientific, Inc. Redman, Wash.; range 0 to 41.5 MPa, serial no. 62724). This instrument is a NIST certified secondary pressure standard with a traceable accuracy of 0.008% of full scale (FS). Also, due to the fact that the pressure transducers were submerged in the water or oil bath, the pressure calibration was also corrected for temperature effects. The Fluke thermometer was calibrated using a standard platinum resistance thermometer (SPRT model 5699, Hart Scientific, American Fork, Utah; range 73 to 933 K) and readout (Blackstack model 1560 with SPRT module 2560). The Blackstack instrument and SPRT are also a certified secondary temperature standard with a NIST traceable accuracy to ±0.005 K. The temperature and pressure uncertainties were ±0.1° K and ±0.13% full scale (0-7 MPa).

The liquid phase NH$_3$ mole fractions (xi) were calculated based on the prepared feed composition and the volume of the sample container using the method described by Yozeki et al. (*Ind. Eng. Chem. Res.* 46:1605-1610, 2007).

Example 1

Solubility of Ammonia in
1-butyl-3-methylimidazolium hexafluorophosphate
([bmi PF$_6$])

The solubility of ammonia in 1-butyl-3-methylimidazolium hexafluorophosphate ([bmim][PF$_6$]) was determined using the method described above.

The results shown in Table 1 demonstrate that ammonia is highly soluble in the ionic liquid 1-butyl-3-methylimidazolium hexafluorophosphate over a range of temperatures and pressures. Therefore, this ionic liquid would be useful in the process and reactor system described herein for the production of ammonia.

TABLE 1

Results of Solubility Measurements of Ammonia in [bmim][PF$_6$]
NH$_3$ (1) + [bmim][PF$_6$] (2)

| T (° K) | P (MPa) | 100x$_1$ (mol %) |
|---|---|---|
| 283.4 | 0.138 | 37.1 ± 1.4 |
| 283.4 | 0.194 | 47.1 ± 1.0 |
| 283.4 | 0.259 | 58.4 ± 0.5 |
| 283.4 | 0.517 | 86.2 ± 0.4 |
| 298.0 | 0.174 | 35.1 ± 3.0 |
| 298.0 | 0.272 | 43.5 ± 1.7 |
| 298.0 | 0.362 | 55.7 ± 1.1 |
| 298.0 | 0.609 | 74.0 ± 0.6 |
| 298.0 | 0.796 | 85.4 ± 0.4 |

TABLE 1-continued

Results of Solubility Measurements of Ammonia in [bmim][PF$_6$]
NH$_3$ (1) + [bmim][PF$_6$] (2)

| T (° K) | P (MPa) | 100x$_1$ (mol %) |
|---|---|---|
| 324.6 | 0.274 | 29.2 ± 2.5 |
| 324.6 | 0.423 | 38.9 ± 1.5 |
| 324.6 | 0.583 | 49.2 ± 1.0 |
| 324.6 | 1.083 | 68.1 ± 0.6 |
| 324.6 | 1.567 | 82.8 ± 0.4 |
| 347.2 | 0.345 | 25.3 ± 2.1 |
| 347.2 | 0.546 | 33.4 ± 1.3 |
| 347.2 | 0.772 | 43.1 ± 0.9 |
| 347.2 | 1.492 | 61.7 ± 0.5 |
| 347.2 | 2.385 | 79.1 ± 0.4 |
| 355.8 | 0.371 | 23.9 ± 2.0 |
| 355.8 | 0.585 | 31.8 ± 1.3 |
| 355.8 | 0.835 | 41.1 ± 0.9 |
| 355.8 | 1.623 | 59.6 ± 0.5 |
| 355.8 | 2.700 | 77.3 ± 0.4 |
| 298.6 | 0.184 | 34.4 ± 2.9 |
| 298.6 | 0.275 | 43.4 ± 1.7 |
| 298.6 | 0.372 | 55.4 ± 1.1 |
| 298.6 | 0.635 | 73.7 ± 0.6 |
| 298.6 | 0.822 | 85.3 ± 0.4 |

Example 2

Solubility of Ammonia in
1-Butyl-3-methylimidazolium tetrafluoroborate
([bmim][BF$_4$])

The solubility of ammonia in 1-butyl-3-methylimidazolium tetrafluoroborate ([bmim][BF$_4$]) was determined using the method described above.

The results shown in Table 2 demonstrate that ammonia is highly soluble in the ionic liquid 1-butyl-3-methylimidazolium tetrafluoroborate over a range of temperatures and pressures. Therefore, this ionic liquid would be useful in the process and reactor system described herein for the production of ammonia.

TABLE 2

Results of Solubility Measurements of Ammonia in [bmim][PF$_4$]
NH$_3$ (1) + [bmim][BF$_4$] (2)

| T (° K) | P (MPa) | 100x$_1$ (mol %) |
|---|---|---|
| 282.2 | 0.091 | 20.1 ± 16.5 |
| 282.2 | 0.134 | 30.3 ± 6.8 |
| 282.2 | 0.187 | 40.4 ± 3.4 |
| 282.2 | 0.290 | 58.2 ± 1.4 |
| 282.2 | 0.396 | 70.9 ± 0.8 |
| 282.2 | 0.497 | 84.4 ± 0.4 |
| 298.4 | 0.128 | 17.3 ± 14.2 |
| 298.4 | 0.196 | 26.6 ± 6.1 |
| 298.4 | 0.272 | 36.7 ± 3.1 |
| 298.4 | 0.437 | 54.8 ± 1.3 |
| 298.4 | 0.613 | 68.3 ± 0.8 |
| 298.4 | 0.818 | 83.3 ± 0.4 |
| 323.6 | 0.196 | 12.2 ± 10.1 |
| 323.6 | 0.308 | 19.9 ± 4.5 |
| 323.6 | 0.432 | 29.2 ± 2.5 |
| 323.6 | 0.713 | 47.3 ± 1.2 |
| 323.6 | 1.049 | 62.2 ± 0.7 |
| 323.6 | 1.535 | 80.5 ± 0.4 |
| 347.5 | 0.257 | 8.0 ± 6.6 |
| 347.5 | 0.409 | 14.0 ± 3.2 |
| 347.5 | 0.582 | 21.9 ± 1.9 |
| 347.5 | 0.977 | 39.1 ± 1.0 |
| 347.5 | 1.493 | 54.2 ± 0.7 |
| 347.5 | 2.375 | 75.9 ± 0.4 |
| 355.1 | 0.275 | 6.8 ± 5.6 |

TABLE 2-continued

Results of Solubility Measurements of Ammonia in [bmim][PF$_4$]
NH$_3$ (1) + [bmim][BF$_4$] (2)

| T (° K) | P (MPa) | 100x$_1$ (mol %) |
|---|---|---|
| 355.1 | 0.445 | 11.7 ± 2.7 |
| 355.1 | 0.629 | 19.5 ± 1.7 |
| 355.1 | 1.058 | 36.4 ± 1.0 |
| 355.1 | 1.626 | 51.6 ± 0.6 |
| 355.1 | 2.570 | 74.9 ± 0.4 |
| 298.6 | 0.127 | 17.4 ± 14.3 |
| 298.6 | 0.196 | 26.7 ± 6.0 |
| 298.6 | 0.271 | 36.7 ± 3.1 |
| 298.6 | 0.437 | 54.8 ± 1.3 |
| 298.6 | 0.616 | 68.3 ± 0.8 |
| 298.6 | 0.807 | 83.4 ± 0.4 |

Example 3

Solubility of Ammonia in
1-ethyl-3-methylimidazolium
bis(trifluoromethylsulfonyl)imide ([emim][Tf$_2$N])

The solubility of ammonia in 1-ethyl-3-methylimidazolium bis(trifluoromethylsulfonyl)imide ([emim][Tf$_2$N]) was determined using the method described above.

The results shown in Table 3 demonstrate that ammonia is highly soluble in the ionic liquid 1-ethyl-3-methylimidazolium bis(trifluoromethylsulfonyl)imide over a range of temperatures and pressures. Therefore, this ionic liquid would be useful in the process and reactor system described herein for the production of ammonia.

TABLE 3

Results of Solubility Measurements of Ammonia in [emim][Tf$_2$N]
NH$_3$ (1) + [emim][Tf$_2$N] (2)

| T (° K) | P (MPa) | 100x$_1$ (mol %) |
|---|---|---|
| 283.3 | 0.114 | 22.0 ± 18.1 |
| 283.3 | 0.222 | 50.4 ± 4.3 |
| 283.3 | 0.330 | 63.4 ± 2.3 |
| 283.3 | 0.479 | 81.1 ± 1.0 |
| 283.3 | 0.606 | 93.1 ± 0.5 |
| 283.3 | 0.618 | 94.8 ± 0.4 |
| 299.4 | 0.136 | 17.1 ± 14.2 |
| 299.4 | 0.287 | 43.0 ± 3.6 |
| 299.4 | 0.434 | 56.8 ± 2.1 |
| 299.4 | 0.698 | 76.8 ± 1.0 |
| 299.4 | 0.969 | 92.1 ± 0.5 |
| 299.4 | 0.994 | 94.3 ± 0.4 |
| 323.4 | 0.171 | 8.9 ± 7.5 |
| 323.4 | 0.379 | 30.5 ± 2.6 |
| 323.4 | 0.582 | 44.4 ± 1.6 |
| 323.4 | 1.019 | 67.3 ± 0.9 |
| 323.4 | 1.711 | 88.8 ± 0.5 |
| 323.4 | 1.840 | 92.6 ± 0.4 |
| 347.6 | 0.196 | 4.5 ± 4.1 |
| 347.6 | 0.457 | 19.8 ± 1.7 |
| 347.6 | 0.709 | 32.3 ± 1.2 |
| 347.6 | 1.285 | 55.8 ± 0.8 |
| 347.6 | 2.488 | 81.8 ± 0.5 |
| 347.6 | 2.860 | 88.6 ± 0.4 |
| 298.4 | 0.145 | 13.7 ± 11.4 |
| 298.4 | 0.288 | 42.7 ± 3.6 |
| 298.4 | 0.427 | 57.3 ± 2.1 |
| 298.4 | 0.683 | 77.2 ± 1.0 |
| 298.4 | 0.940 | 92.2 ± 0.5 |
| 298.4 | 0.958 | 94.4 ± 0.4 |

Example 4

Solubility of Ammonia in 1-hexyl-3-methylimidazolium chloride ([hmim][Cl])

The solubility of ammonia in 1-hexyl-3-methylimidazolium chloride ([hmim][Cl]) was determined using the method described above.

The results shown in Table 4 demonstrate that ammonia is highly soluble in the ionic liquid 1-hexyl-3-methylimidazolium chloride over a range of temperatures and pressures. Therefore, this ionic liquid would be useful in the process and reactor system described herein for the production of ammonia.

TABLE 4

Results of Solubility Measurements of Ammonia in [hmim][Cl]
$NH_3$ (1) + [hmim][Cl] (2)

| T (° K) | P (MPa) | $100x_1$ (mol %) |
|---|---|---|
| 283.1 | 0.044 | 9.5 ± 8.2 |
| 283.1 | 0.094 | 25.4 ± 3.5 |
| 283.1 | 0.151 | 36.3 ± 1.9 |
| 283.1 | 0.252 | 56.2 ± 1.0 |
| 283.1 | 0.415 | 74.5 ± 0.5 |
| 283.1 | 0.511 | 83.7 ± 0.4 |
| 297.8 | 0.059 | 8.6 ± 7.3 |
| 297.8 | 0.133 | 23.1 ± 3.2 |
| 297.8 | 0.216 | 33.7 ± 1.8 |
| 297.8 | 0.377 | 53.7 ± 1.0 |
| 297.8 | 0.647 | 72.8 ± 0.5 |
| 297.8 | 0.816 | 82.8 ± 0.4 |
| 324.3 | 0.103 | 6.0 ± 5.1 |
| 324.3 | 0.198 | 19.4 ± 2.7 |
| 324.3 | 0.327 | 29.4 ± 1.6 |
| 324.3 | 0.633 | 47.9 ± 0.9 |
| 324.3 | 1.186 | 68.1 ± 0.5 |
| 324.3 | 1.600 | 79.9 ± 0.4 |
| 347.9 | 0.102 | 6.5 ± 5.5 |
| 347.9 | 0.246 | 17.2 ± 2.4 |
| 347.9 | 0.436 | 25.3 ± 1.3 |
| 347.9 | 0.883 | 41.9 ± 0.8 |
| 347.9 | 1.727 | 62.4 ± 0.5 |
| 347.9 | 2.490 | 75.6 ± 0.4 |
| 298.1 | 0.053 | 9.0 ± 7.7 |
| 298.1 | 0.111 | 24.6 ± 3.4 |
| 298.1 | 0.190 | 34.9 ± 1.8 |
| 298.1 | 0.373 | 53.6 ± 1.0 |
| 298.1 | 0.649 | 72.8 ± 0.5 |
| 298.1 | 0.819 | 82.8 ± 0.4 |

Example 5

Solubility of Ammonia in 1-ethyl-3-methylimidazolium acetate ([emim][$CH_3COO$])

The solubility of ammonia in 1-ethyl-3-methylimidazolium acetate ([emim][$CH_3COO$]) was determined using the method described above.

The results shown in Table 5 demonstrate that ammonia is highly soluble in the ionic liquid 1-ethyl-3-methylimidazolium acetate over a range of temperatures and pressures. Therefore, this ionic liquid would be useful in the process and reactor system described herein for the production of ammonia.

TABLE 5

Results of Solubility Measurements of Ammonia in [emim][$CH_3COO$]
$NH_3$ (1) + [emim][$CH_3COO$] (2)

| T (° K) | P (MPa) | $100x_1$ (mol %) |
|---|---|---|
| 282.5 | 0.321 | 62.4 ± 1.2 |
| 282.5 | 0.435 | 74.9 ± 0.8 |
| 282.5 | 0.488 | 80.2 ± 0.4 |
| 282.5 | 0.525 | 83.4 ± 0.4 |
| 282.5 | 0.535 | 84.7 ± 0.4 |
| 282.5 | 0.550 | 87.7 ± 0.4 |
| 298.3 | 0.470 | 59.9 ± 2.0 |
| 298.3 | 0.667 | 73.0 ± 1.2 |
| 298.3 | 0.765 | 78.8 ± 0.8 |
| 298.3 | 0.820 | 82.5 ± 0.8 |
| 298.3 | 0.850 | 83.9 ± 0.8 |
| 298.3 | 0.898 | 87.1 ± 0.4 |
| 324.5 | 0.792 | 53.8 ± 4.0 |
| 324.5 | 1.178 | 68.3 ± 3.2 |
| 324.5 | 1.420 | 75.0 ± 2.4 |
| 324.5 | 1.568 | 79.5 ± 1.6 |
| 324.5 | 1.633 | 81.4 ± 1.6 |
| 324.5 | 1.774 | 85.2 ± 1.2 |
| 348.5 | 1.098 | 47.3 ± 6.8 |
| 348.5 | 1.710 | 62.0 ± 6.0 |
| 348.5 | 2.134 | 69.4 ± 5.2 |
| 348.5 | 2.423 | 75.1 ± 4.0 |
| 348.5 | 2.569 | 77.3 ± 3.6 |
| 348.5 | 2.891 | 81.9 ± 2.8 |
| 298.2 | 0.463 | 60.1 ± 2.0 |
| 298.2 | 0.662 | 73.1 ± 1.2 |
| 298.2 | 0.759 | 78.9 ± 0.8 |
| 298.2 | 0.818 | 82.5 ± 0.8 |
| 298.2 | 0.845 | 83.9 ± 0.8 |
| 298.2 | 0.896 | 87.1 ± 0.4 |

Example 6

Solubility of Ammonia in 1-ethyl-3-methylimidazolium ethylsulfate ([emim][$EtOSO_3$])

The solubility of ammonia in 1-ethyl-3-methylimidazolium ethylsulfate ([emim][$EtOSO_3$]) was determined using the method described above.

The results shown in Table 6 demonstrate that ammonia is highly soluble in the ionic liquid 1-ethyl-3-methylimidazolium ethylsulfate over a range of temperatures and pressures. Therefore, this ionic liquid would be useful in the process and reactor system described herein for the production of ammonia.

TABLE 6

Results of Solubility Measurements of Ammonia in [emim][$EtOSO_3$]
$NH_3$ (1) + [emim][$EtOSO_3$] (2)

| T (° K) | P (MPa) | $100x_1$ (mol %) |
|---|---|---|
| 282.7 | 0.287 | 53.6 ± 0.9 |
| 282.7 | 0.427 | 70.7 ± 0.6 |
| 282.7 | 0.517 | 80.5 ± 0.3 |
| 282.7 | 0.544 | 83.9 ± 0.2 |
| 282.7 | 0.586 | 87.5 ± 0.1 |
| 297.6 | 0.418 | 51.8 ± 1.4 |
| 297.6 | 0.651 | 69.4 ± 0.9 |
| 297.6 | 0.802 | 79.8 ± 0.5 |
| 297.6 | 0.855 | 83.3 ± 0.4 |
| 297.6 | 0.916 | 87.1 ± 0.2 |
| 322.3 | 0.706 | 47.7 ± 2.6 |
| 322.3 | 1.166 | 66.1 ± 1.9 |
| 322.3 | 1.510 | 77.8 ± 1.2 |
| 322.3 | 1.641 | 81.8 ± 0.9 |
| 322.3 | 1.771 | 86.2 ± 0.5 |

TABLE 6-continued

Results of Solubility Measurements of Ammonia in [emim][EtOSO$_3$]
$NH_3$ (1) + [emim][EtOSO$_3$] (2)

| T (° K) | P (MPa) | 100x$_1$ (mol %) |
|---|---|---|
| 347.5 | 1.051 | 42.4 ± 4.4 |
| 347.5 | 1.819 | 61.3 ± 3.8 |
| 347.5 | 2.500 | 74.4 ± 2.6 |
| 347.5 | 2.790 | 79.0 ± 2.1 |
| 347.5 | 3.091 | 84.4 ± 1.3 |
| 372.3 | 2.461 | 56.2 ± 6.2 |
| 372.3 | 3.593 | 69.7 ± 5.1 |
| 372.3 | 4.118 | 74.7 ± 4.5 |
| 372.3 | 4.777 | 81.2 ± 3.2 |
| 298.1 | 0.421 | 51.8 ± 1.4 |
| 298.1 | 0.653 | 69.4 ± 0.9 |
| 298.1 | 0.812 | 79.8 ± 0.5 |
| 298.1 | 0.869 | 83.3 ± 0.4 |
| 298.1 | 0.933 | 87.1 ± 0.2 |

Example 7

Solubility of Ammonia in 1-ethyl-3-methylimidazolium thiocyanate ([emim][SCN])

The solubility of ammonia in 1-ethyl-3-methylimidazolium thiocyanate ([emim][SCN]) was determined using the method described above.

The results shown in Table 7 demonstrate that ammonia is highly soluble in the ionic liquid 1-ethyl-3-methylimidazolium thiocyanate over a range of temperatures and pressures. Therefore, this ionic liquid would be useful in the process and reactor system described herein for the production of ammonia.

TABLE 7

Results of Solubility Measurements of Ammonia in [emim][SCN]
$NH_3$ (1) + [emim][SCN] (2)

| T (° K) | P (MPa) | 100x$_1$ (mol %) |
|---|---|---|
| 283.2 | 0.244 | 45.1 ± 0.7 |
| 283.2 | 0.364 | 65.2 ± 0.5 |
| 283.2 | 0.447 | 73.1 ± 0.4 |
| 283.2 | 0.502 | 78.6 ± 0.2 |
| 283.2 | 0.547 | 81.9 ± 0.2 |
| 283.2 | 0.590 | 87.6 ± 0.1 |
| 298.1 | 0.307 | 44.4 ± 0.9 |
| 298.1 | 0.536 | 64.2 ± 0.7 |
| 298.1 | 0.672 | 72.3 ± 0.5 |
| 298.1 | 0.747 | 78.1 ± 0.4 |
| 298.1 | 0.815 | 81.5 ± 0.3 |
| 298.1 | 0.911 | 87.4 ± 0.1 |
| 322.6 | 0.535 | 41.6 ± 1.6 |
| 322.6 | 0.961 | 61.8 ± 1.4 |
| 322.6 | 1.241 | 70.4 ± 1.1 |
| 322.6 | 1.420 | 76.6 ± 0.8 |
| 322.6 | 1.562 | 80.4 ± 0.6 |
| 322.6 | 1.777 | 86.9 ± 0.3 |
| 348.0 | 0.840 | 37.8 ± 2.7 |
| 348.0 | 1.553 | 58.1 ± 2.6 |
| 348.0 | 2.045 | 67.3 ± 2.2 |
| 348.0 | 2.419 | 74.1 ± 1.7 |
| 348.0 | 2.711 | 78.4 ± 1.4 |
| 348.0 | 3.174 | 85.8 ± 0.8 |
| 372.8 | 1.149 | 34.0 ± 4.4 |
| 372.8 | 2.144 | 54.2 ± 4.1 |
| 372.8 | 2.958 | 63.3 ± 3.5 |
| 372.8 | 3.576 | 70.8 ± 3.2 |
| 372.8 | 4.120 | 75.4 ± 2.8 |
| 372.8 | 5.007 | 83.9 ± 1.7 |
| 298.1 | 0.314 | 44.3 ± 0.9 |
| 298.1 | 0.540 | 64.2 ± 0.7 |
| 298.1 | 0.666 | 72.4 ± 0.5 |
| 298.1 | 0.772 | 78.0 ± 0.4 |
| 298.1 | 0.831 | 81.5 ± 0.3 |
| 298.1 | 0.930 | 87.4 ± 0.1 |

Example 8

Solubility of Ammonia in N,N-dimethylethanolammonium ethanoate [(CH$_3$)$_2$NHCH$_2$CH$_2$OH][CH$_3$COO]

The solubility of ammonia in N,N-dimethylethanolammonium ethanoate was determined using the method described above.

The results shown in Table 8 demonstrate that ammonia is highly soluble in the ionic liquid N,N-dimethylethanolammonium ethanoate over a range of temperatures and pressures. Therefore, this ionic liquid would be useful in the process and reactor system described herein for the production of ammonia.

TABLE 8

Results of Solubility Measurements of Ammonia in N,N-dimethylethanolammonium ethanoate
$NH_3$ (1) + [(CH$_3$)$_2$NHCH$_2$CH$_2$OH][CH$_3$COO] (2)

| T (° K) | P (MPa) | 100x$_1$ (mol %) |
|---|---|---|
| 283.2 | 0.136 | 47.7 ± 3.7 |
| 283.2 | 0.198 | 62.0 ± 2.4 |
| 283.2 | 0.288 | 71.6 ± 1.8 |
| 283.2 | 0.316 | 76.8 ± 1.2 |
| 283.2 | 0.415 | 81.9 ± 0.8 |
| 283.2 | 0.491 | 86.5 ± 0.5 |
| 298.1 | 0.163 | 47.5 ± 3.8 |
| 298.1 | 0.278 | 61.6 ± 2.4 |
| 298.1 | 0.431 | 71.3 ± 1.8 |
| 298.1 | 0.500 | 76.5 ± 1.2 |
| 298.1 | 0.641 | 81.6 ± 0.8 |
| 298.1 | 0.769 | 86.4 ± 0.5 |
| 322.7 | 0.277 | 46.6 ± 4.2 |
| 322.7 | 0.463 | 60.9 ± 2.3 |
| 322.7 | 0.786 | 70.4 ± 1.7 |
| 322.7 | 0.980 | 75.7 ± 1.1 |
| 322.7 | 1.250 | 80.9 ± 0.7 |
| 322.7 | 1.521 | 86.0 ± 0.5 |
| 348.0 | 0.433 | 45.4 ± 4.7 |
| 348.0 | 0.693 | 60.0 ± 3.1 |
| 348.0 | 1.335 | 69.1 ± 2.0 |
| 348.0 | 1.680 | 74.5 ± 1.3 |
| 348.0 | 2.164 | 79.9 ± 1.0 |
| 348.0 | 2.689 | 85.3 ± 0.6 |
| 372.8 | 1.994 | 67.5 ± 2.2 |
| 372.8 | 2.529 | 73.1 ± 1.3 |
| 372.8 | 3.305 | 78.5 ± 0.7 |
| 372.8 | 4.249 | 84.4 ± 0.5 |
| 298.1 | 0.401 | 71.4 ± 2.0 |
| 298.1 | 0.496 | 76.5 ± 1.2 |
| 298.1 | 0.637 | 81.6 ± 0.8 |
| 298.1 | 0.791 | 86.4 ± 0.5 |

The term "invention" as used herein is a non-limiting term, and is not intended to refer to any single embodiment of the various inventions hereof to the exclusion of others, but encompasses all possible embodiments as described in the specification and the claims.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

In this specification, unless explicitly stated otherwise or indicated to the contrary by the context of usage, amounts, sizes, ranges, formulations, parameters, and other quantities and characteristics recited herein, particularly when modified by the term "about", may but need not be exact, and may also be approximate and/or larger or smaller (as desired) than stated, reflecting tolerances, conversion factors, rounding off, measurement error and the like, as well as the inclusion within a stated value of those values outside it that have, within the context of this invention, functional and/or operable equivalence to the stated value.

What is claimed is:

1. A process for producing ammonia comprising the steps of:
   (a) combining nitrogen and hydrogen in the presence of a catalyst to produce ammonia; and
   (b) absorbing a portion of the ammonia so produced with an ionic liquid that comprises an ammonium cation.

2. The process according to claim 1 wherein the ammonium cation is represented by the structure of the following formula:

$N^+(R^7)(R^8)(R^9)(R^{10})$ wherein:
   (a) $R^7$, $R^8$, $R^9$, and $R^{10}$ are independently selected from the group consisting of:
   (i) $-CH_3$, $-C_2H_5$, or a $C_3$ to $C_{25}$ straight-chain, branched or cyclic alkane or alkene group, optionally substituted with at least one member selected from the group consisting of Cl, Br, F, I, OH, $NH_2$ and SH;
   (ii) $-CH_3$, $-C_2H_5$, or a $C_3$ to $C_{25}$ straight-chain, branched or cyclic alkane or alkene group comprising one to three heteroatoms selected from the group consisting of O, N, Si and S, and optionally substituted with at least one member selected from the group consisting of Cl, Br, F, I, OH, $NH_2$ and SH;
   (iii) a $C_6$ to $C_{25}$ unsubstituted aryl, or a $C_6$ to $C_{25}$ unsubstituted heteroaryl, group having one to three heteroatoms independently selected from the group consisting of O, N, Si and 5, and
   (iv) a $C_6$ to $C_{25}$ substituted aryl, or a $C_6$ to $C_{25}$ substituted heteroaryl, group having one to three heteroatoms independently selected from the group consisting of O, N, Si and S, and wherein the substituted aryl or substituted heteroaryl group has one to three substituents independently selected from the group consisting of:
   (A) $-CH_3$, $-C_2H_5$, or a $C_3$ to $C_{25}$ straight-chain, branched or cyclic alkane or alkene group, optionally substituted with at least one member selected from the group consisting of Cl, Br, F, I, OH, $NH_2$ and SH,
   (B) OH,
   (C) $NH_2$, and
   (D) SH; and
   (v) $-(CH_2)_nSi(CH_2)_mCH_3$, $-(CH_2)_nSi(CH_3)_3$, and $-(CH_2)_nOSi(CH_3)_m$, where n is independently 1-4 and m is independently 0-4; and
   (b) optionally, at least two of $R^7$, $R^8$, $R^9$, and $R^{10}$, can together form a cyclic or bicyclic alkanyl or alkenyl group.

3. The process according to claim 1 further comprising a step of recovering the ammonia absorbed by the ionic liquid.

4. The process according to claim 1 wherein the ionic liquid comprises an anion selected from the group consisting of
   (a) $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]$, $[CF_3CF_2OCF_2CF_2SO_3]^-$, $[(CF_2HCF_2SO_2)_2N]_-$, $[(CF_3CFHCF_2SO_2)_2N]^-$, and $F^-$; and
   (b) anions represented by the structure of the following formula:

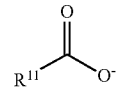

wherein $R^{11}$ is selected from the group consisting of:
   (i) $-CH_3$, $-C_2H_5$, or a $C_3$ to $C_{10}$ straight-chain, branched or cyclic alkane or alkene group;
   (ii) $-CH_3$, $-C_2H_5$, or a $C_3$ to $C_{10}$ straight-chain, branched or cyclic alkane or alkene group that contains one to three heteroatoms selected from the group consisting of O, N, Si and 5, and
   (iii) a $C_6$ to $C_{10}$ substituted aryl, or a $C_6$ to $C_{10}$ substituted heteroaryl, group having one to three heteroatoms independently selected from the group consisting of O, N, Si and 5, and wherein the substituted aryl or substituted heteroaryl group has one to three substituents independently selected from the group consisting of: $-CH_3$, $-C_2H_5$, and a $C_3$ to $C_{10}$ straight-chain, branched or cyclic alkane or alkene group.

5. The process according to claim 1 wherein the nitrogen and hydrogen are combined at a temperature in the range of about 300° C. to about 550° C.

6. The process according to claim 1 wherein the nitrogen and hydrogen are combined at a pressure in the range of about 8 MPa to about 40 MPa.

7. The process according to claim 1 wherein the ammonia is absorbed by the ionic liquid at a temperature in the range of about 20° C. to about 200° C.

8. The process according to claim 1 wherein the ammonia is absorbed by the ionic liquid at a pressure in the range of about 100 kPa to about 40 MPa.

9. The process according to claim 1 wherein the ionic liquid comprises a fluorinated anion.

10. The process according to claim 2 wherein an R group selected from $R^7$, $R^8$, $R^9$ and $R^{10}$ is a group substituted with F.

11. The process according to claim 1 wherein the ionic liquid comprises an anion selected from the group consisting of: $[CH_3CO_2]^-$, $[NO_3]^-$, $[SO_4]^{2-}$, $[HPO_3]^{2-}$, $[H_2PO_3]^{1-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$, carborates optionally substituted with an alkyl or substituted alkyl group; and carboranes optionally substituted with an alkylamine, substituted alkylamine, alkyl or substituted alkyl group.

12. The process according to claim 1 wherein the ionic liquid comprises an anion selected from the group consisting of aminoacetate, ascorbate, benzoate, catecholate, citrate, dimethylphosphate, formate, fumarate, gallate, glycolate, glyoxylate, iminodiacetate, isobutyrate, kojate, lactate, levulinate, oxalate, pivalate, propionate, pyruvate, salicylate, succinamate, succinate, tiglate, tetrafluoroborate, tetrafluoroethanesulfonate, and tropolonate.

* * * * *